(12) United States Patent
LaConte et al.

(10) Patent No.: US 7,524,154 B2
(45) Date of Patent: Apr. 28, 2009

(54) ECCENTRIC FASTENING DEVICE

(75) Inventors: Richard J. LaConte, Black Diamond, WA (US); Michael O. Nebeker, Everett, WA (US)

(73) Assignee: The Boeing Company, Chicago, IL (US)

( * ) Notice: Subject to any disclaimer, the term of this patent is extended or adjusted under 35 U.S.C. 154(b) by 410 days.

(21) Appl. No.: 11/164,509

(22) Filed: Nov. 28, 2005

(65) Prior Publication Data

US 2007/0122254 A1    May 31, 2007

(51) Int. Cl.
F16B 21/02    (2006.01)
(52) U.S. Cl. ............ 411/551; 411/349; 411/372.6
(58) Field of Classification Search ........... 411/347, 411/349, 549–552, 372.6
See application file for complete search history.

(56) References Cited

U.S. PATENT DOCUMENTS

| | | | | |
|---|---|---|---|---|
| 1,372,242 | A * | 3/1921 | Mepsted | 411/347 |
| 1,426,098 | A * | 8/1922 | Pruitt | 411/368 |
| 1,785,709 | A | 12/1930 | Campau | |
| 1,854,737 | A * | 4/1932 | Haug | 411/378 |
| 2,403,247 | A | 7/1946 | Sullivan | |
| 3,747,168 | A | 7/1973 | Snarskis | |
| 3,956,803 | A * | 5/1976 | Leitner | 411/349 |
| 4,372,015 | A * | 2/1983 | Rhoton | 269/47 |
| 4,789,287 | A * | 12/1988 | Le | 411/107 |
| 5,346,349 | A * | 9/1994 | Giovannetti | 411/549 |
| 5,370,488 | A * | 12/1994 | Sykes | 411/551 |
| 5,387,047 | A | 2/1995 | Korpi | |
| 2005/0084361 | A1 | 4/2005 | Fly | |

FOREIGN PATENT DOCUMENTS

FR    2606097    5/1988

* cited by examiner

*Primary Examiner*—Flemming Saether
(74) *Attorney, Agent, or Firm*—Ostrager Chong Flaherty & Broitman P.C.

(57) ABSTRACT

An eccentric fastening device is provided. The eccentric fastening device includes a first threaded fastener, a base and a rotary lug providing a non-fastened pre-assembled position. The base includes a top, a bottom, a stem and a hole, where the stem axially extends from the bottom of the base, and the hole axially extends from the top through the stem of the base. The rotary lug is releasably retained in the hole of the base by the first threaded fastener. The rotary lug includes a cylindrical portion having a thread and a head, wherein the head is offset from the cylindrical portion. The cylindrical portion is substantially axially concentric with the hole of the base, allowing the head to be eccentrically rotated on or off of the stem, whereby a selective structure may be variably clamped and releasably retained between said head and said base. An aircraft having an eccentric fastening device is also provided. A method of installing the same is also provided.

15 Claims, 4 Drawing Sheets

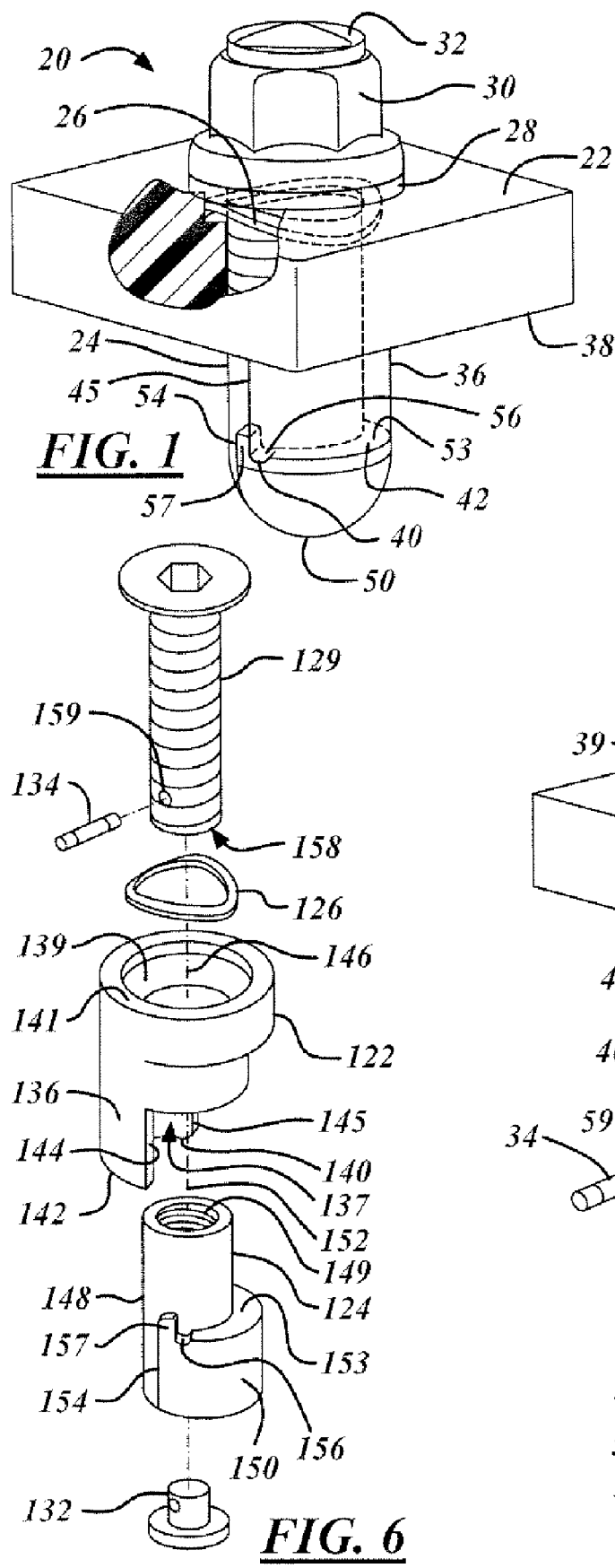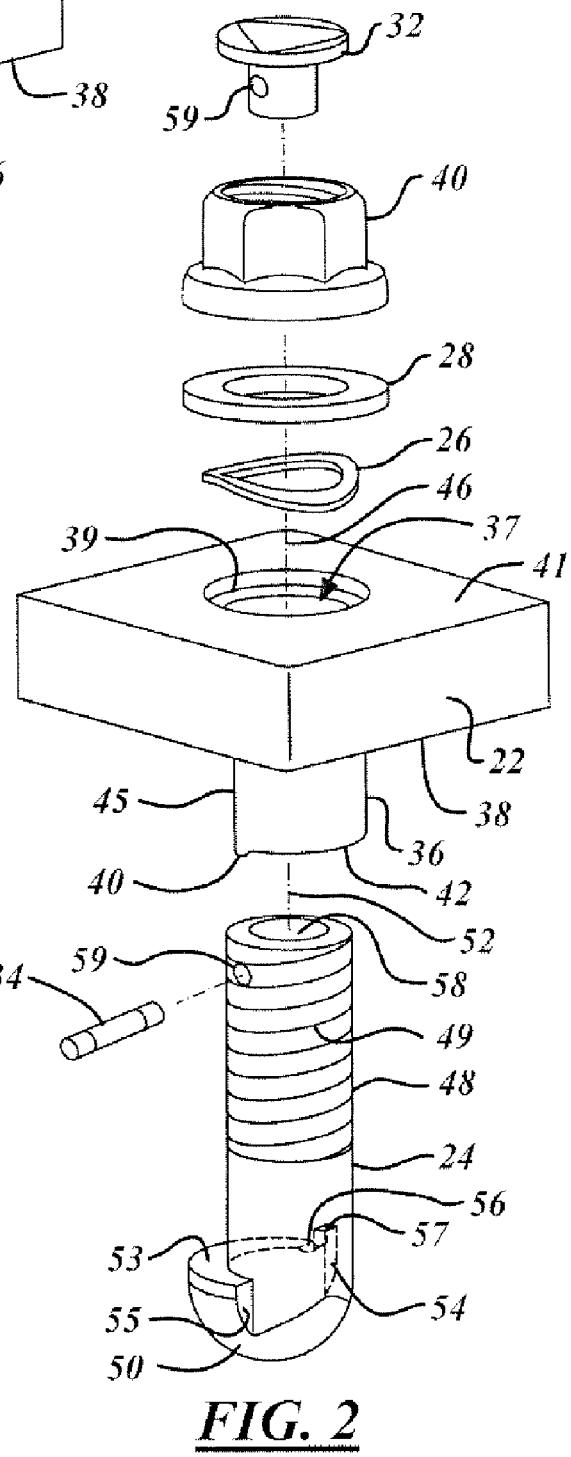

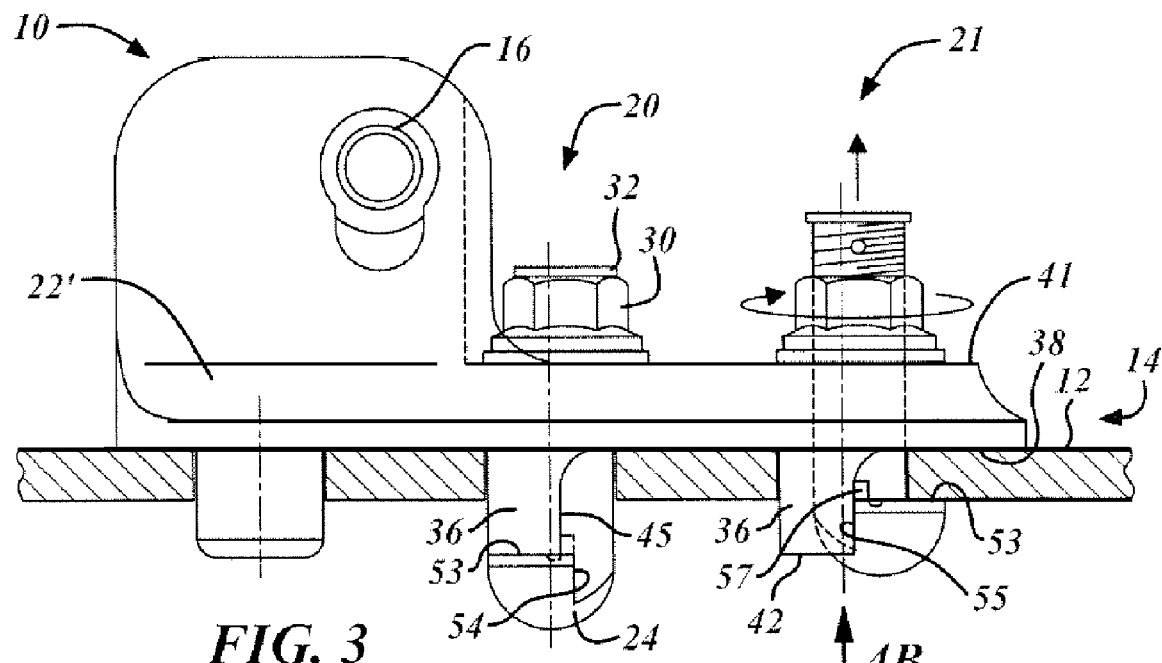
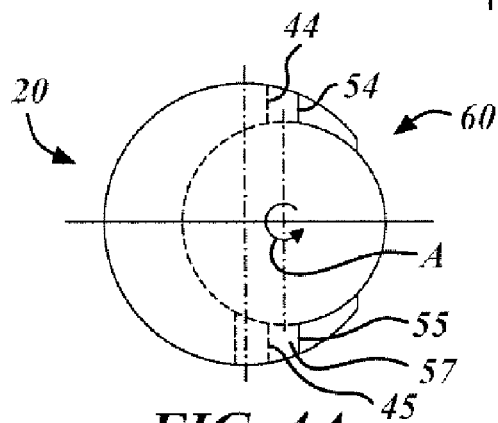
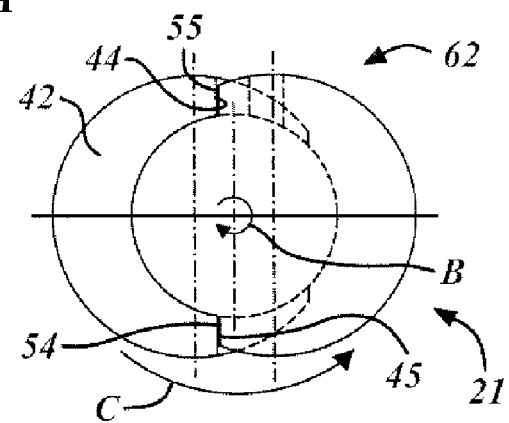
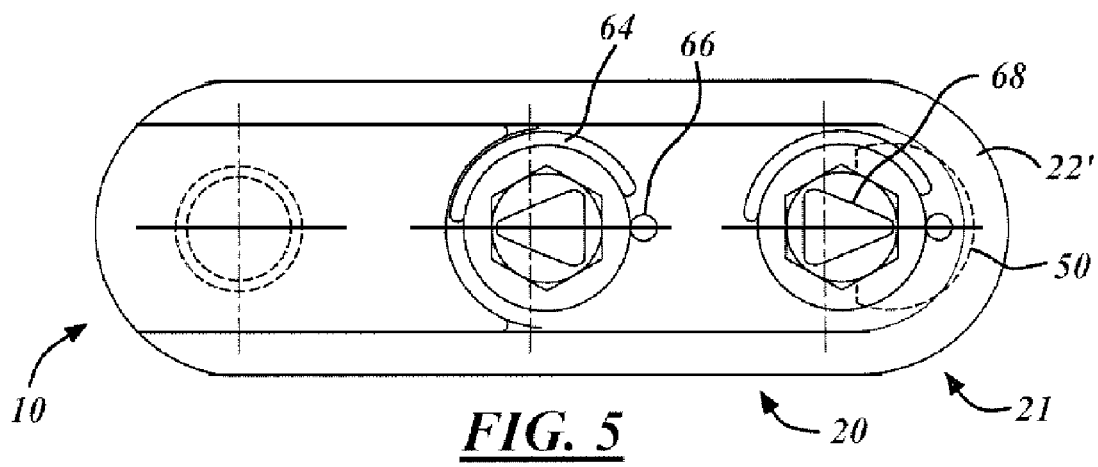

ECCENTRIC FASTENING DEVICE

TECHNICAL FIELD

The present invention relates generally to fastening systems, and more particularly, to a device, system and method for blind and/or eccentric fastening.

BACKGROUND OF THE INVENTION

There are many kinds of fastener that may be utilized in order to fasten monuments and other interior components to a structure of a building or a vehicle. Of particular interest is the fastening of seats, or other interior components, for example, to a floor of an aircraft. The floor of the aircraft traditionally includes rows of channels running the length of the aircraft floor with location cutouts at one inch spacing in which a seat may be attached. Attachment of the seat to the channels is accomplished by sliding a mushroom-shaped fastener through a seat, then through a cutout of the channel's flange, thereafter securing the mushroom fastener to the seat and channel. While mushroom-shaped fasteners provide secure attachment, it is, however, time intensive especially when the installation occurs in a blind application, i.e., an application where you cannot inspect the underside of the fastener.

Several blind fastener configurations exist that may be used to attach a seat to a floor system requiring blind fastening. One device is a "Cleco" fastener, which may used to hold panels in position prior to riveting. This fastener uses a pair of opposing barbs that are spring closed, thereby allowing insertion of the fastener into a hole. A spreader bar is then pushed between the barbs of the fastener thereby filling the hole and allowing the barbs to grip the back or blind side of the hole. Other blind fasteners use variants of the Cleco fastener including multiple barbed flanges or a threaded spreader bar. While the existing blind fasteners provide attachment support to a structure, they have difficulty adjusting to a wide range of structure thickness or to surfaces having variable or stepped thickness while providing positive clamping of the attaching components. Moreover, blind fasteners may be difficult to remove, in some instances are not reusable without replacement parts, and many times are made for a one-time use.

It is therefore desirable to provide a fastening device that improves the installation, inspection or removal assembly process. Specifically, it is desirable to provide a fastening device that can be rapidly installed from the top down and providing a secure, high strength attachment. Also, it is desirable to provide a fastening device that can be rapidly and reusably removed from the top up. Moreover, it is desirable to provide a fastening device that is capable of variable adjustment for selective attachment to a constant, variable or stepped thickness of different attachment surfaces.

SUMMARY OF THE INVENTION

Accordingly, an eccentric fastening device is provided. The eccentric fastening device includes a base having a shank or stem, a threaded offset rotary lug that rests upon the stem in a pre-assembly position, thereby providing a compact fastener that may be inserted through a hole wherein the eccentric rotary fastener may be inserted thru the hole, rotated 180 degrees, and tightened with a nut or bolt to the required clamping thickness.

In a first embodiment of the invention, the eccentric fastening device includes a first threaded fastener, a base and a rotary lug providing a non-fastened pre-assembled position. The base includes a top, a bottom, a stem and a hole, where the stem axially extends from the bottom of the base, and the hole axially extends from the top through the stem of the base. The rotary lug is releasably retained in the hole of the base by the first threaded fastener. The rotary lug includes a cylindrical portion having a thread and a head, wherein the head is offset from the cylindrical portion. The cylindrical portion is substantially axially concentric with the hole of the base, allowing the head to be eccentrically rotated on or off of the stem, whereby a selective structure may be variably clamped and releasably retained between said head and said base.

In a second embodiment of the invention, the eccentric fastening device is used to advantage on a seat fitting assembly used for attaching an aircraft seat to a floor of an aircraft. For example, without limitation, the new Boeing Dreamliner or 787 is utilizing a new floor system that may use the present invention to advantage for fastening seats, monuments and other interior components thereto. The new floor system utilizes a flat-topped extrusion having holes at equal spacing requiring blind installation from the top down. The seat fitting assembly using the present invention to advantage allows for rapid installation, although it is a blind fastening application.

Additional embodiments of the invention are also provided. A method of installing the eccentric fastening device is also provided.

The present invention has several advantages over existing fasteners. One advantage of the present invention is that the eccentric fastening device improves the installation, inspection or removal assembly process.

Another advantage of the present invention is that it provides an eccentric fastening device that can be rapidly installed from the top down and provides a secure, high strength attachment.

Furthermore, the present invention provides an eccentric fastening device that can be rapidly and reusably removed from the top up.

Moreover, the present invention provides an eccentric fastening device that is capable of variable adjustment for selective attachment to a constant, variable or stepped thickness of different attachment surfaces.

The present invention itself, together with further objects and attendant advantages, will be best understood by reference to the following detailed description, taken in conjunction with the accompanying drawings.

BRIEF DESCRIPTION OF THE DRAWINGS

FIG. 1 is a partial cut-away elevation view of an eccentric fastening device in accordance with a first embodiment of the present invention.

FIG. 2 is an exploded view of the eccentric fastening device shown in FIG. 1.

FIG. 3 is a side view of a seat fitting assembly attached to an exemplary flat-topped extrusion of an airplane floor using eccentric fastening devices in accordance with a second embodiment of the present invention.

FIG. 4A is a perspective view of the eccentric fastening device in a non-fastened pre-assembled position in accordance with the second embodiment as indicated in FIG. 3.

FIG. 4B is a perspective view of the eccentric fastening device in a fastened position in accordance with the second embodiment as indicated in FIG. 3.

FIG. 5 is a top view of the seat fitting assembly in accordance with the second embodiment of the invention.

FIG. 6 is an exploded view of the eccentric fastening device in accordance with a third embodiment of the present invention.

DETAILED DESCRIPTION OF THE PREFERRED EMBODIMENT

Figure 7:
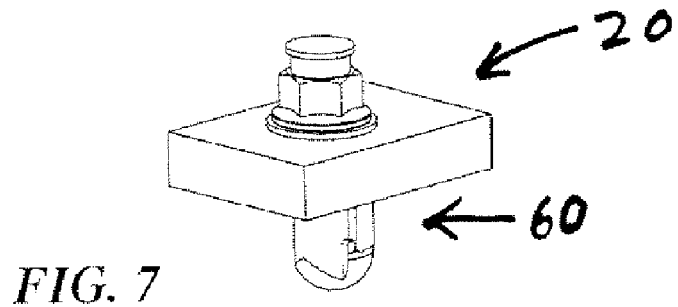
FIG. 7 is a view of a non-fastened pre-assembled position of an eccentric fastening device in accordance with the present invention.

In each of the following figures, the same reference numerals are used to refer to the same components. While the present invention is described with respect to a device, system and method for blind and/or eccentric fastening, the present invention may be adapted for various applications and systems known in the art.

In the following description, various operating parameters and components are described for each embodiment. These specific parameters and components are included as examples and are not meant to be limiting.

FIGS. 1 and 2 will be described together. FIG. 1 shows a partial cut-away elevation view of an eccentric fastening device 20 in accordance with a first embodiment of the present invention. FIG. 2 shows an exploded view of the eccentric fastening device 20 shown in FIG. 1. The eccentric fastening device (EFD) 20 includes a base 22, a rotary lug 24, an optional spring washer 26, an optional flat washer 28, a nut 30, an optional cap 32 and an optional pin 34.

The base 22 is cube-shaped having a shank or stem 36 extending from a bottom side 38 of the base 22 and a hole 37 extending through the bottom side 38 of the base 22. The stem 36 is semi-cylindrical or crescent shaped having a first center (not shown), a first guide surface (not shown), a second guide surface 45, a stem seat 42 and an optional nub or protrusion 40 extending out of the stem seat 42. The hole 37 has a second center (represented by exploded view line 46) that is offset from the first center of the stem 36 such that a rotary lug 24 may be received through the hole 37 and rest against the stem seat 42 when the EFD 20 is in its non-fastened pre-assembled position. The base 22 provides structural support for supporting a rotary lug 24 while at the same time allowing for eccentric rotation of the lug 24 with respect to the stem 36 of the base 22.

The base 22 may optionally have a washer seat 39 in its top side 41 concentric with the hole 37 for advantageously receiving a spring washer 26.

It is recognized that the base 22 may have any shape consistent with the present invention and need not be cube-shaped. Also, the stem 36 may have any shape consistent with the present invention and need not be crescent-shaped.

The rotary lug 24 includes a cylindrical portion 48 having an external thread 49 and a head 50. The head 50 is semi-spherically shaped and includes a lug seat 53, a first stop surface 54, a second stop surface 55, an optional recess 56 in the lug seat 53, and a tab 57 extending from the lug seat 53. The head 50 has a diametrical center (not shown) offset from a cylindrical center (represented by exploded view line 52) of the rotary lug 24 such that the lug seat 53 of the rotary lug 24 may rest against a stem seat 42 of a base 22 when the EFD 20 is in its non-fastened pre-assembled position. Moreover, the optional recess 56 of the rotary lug 24 may releasably receive a protrusion 40 of a base 22 when the EFD 20 is in its non-fastened pre-assembled position, thereby providing positive parking detent to facilitate installation and removal of the EFD 20.

It is recognized that the head 50 of the rotary lug 24 may have any shape consistent with the present invention and need not be semi-spherically shaped.

The rotary lug 24 optionally includes a bore 58 and a pin slot 59 both located in the cylindrical portion 48, wherein an optional cap 32 may be received in the bore 58 and retentively held by a spring pin 34 in the pin slot 59 of the rotary lug 24.

The tab 57 allows for partial eccentric rotation of the lug seat 53 of the rotary lug 24 by engaging the first guide surface 44 of the stem 36 of the base 22 when the lug seat 53 has cleared the stem seat 42 during eccentric rotation of the rotary lug 24. The tab 57, when acting in the opposite rotary direction, stops the partial eccentric rotation of the lug seat 53 of the rotary lug 24 by engaging the second guide surface 45 of the stem 36 of the base 22 when the lug seat 53 is eccentrically rotated onto the stem seat 42.

Assembly of the EFD 20 is by receiving the cylindrical portion 48 of the rotary lug 24 through the hole 37 on the bottom side 38 of the base 22, and then retaining the rotary lug 24 to the base 22 by receiving the washers 26, 28 and nut 30 onto the external thread 49 of the rotary lug 24 on the top side 41 of the base 22. As shown in FIG. 1, the EFD 20 is assembled into a non-fastened pre-assembled position whereby the tab 57 of the rotary lug 24 is resting against the second guide surface 45 and allowing the rotary lug 24 to eccentrically rotate in one direction; the spring washer 26 providing retention such that the protrusion 40 is releasably engaging the recess 56 thereby rotationally holding the rotary lug 24 in its non-fastened position; and the cap 32 preventing disassembly of the EFD 20 but allowing for rotation and tightening into a fastened position. Rotation and fastening of the EFD 20 will be better understood by the additional embodiments described below.

The EFD 20 may be attached to any surface, blind application or otherwise, by clamping a selected surface between the lug seat 53 of the rotary lug 24 and the bottom side 38 of the base 22. Also, when the EFD 20 of this embodiment is in its non-fastened pre-assembled position, the rotary lug 24 and the stem 36 provide for compact insertion into a hole in a selected surface.

FIGS. 3, 4A, 4B and 5 will now be described. FIG. 3 shows a side view of a seat fitting assembly 10 attached to an exemplary flat-topped extrusion 12 of an airplane floor 14 using eccentric fastening devices 20, 21 in accordance with a second embodiment of the present invention. The seat fitting assembly 10 includes a base 22' and a rotary joint 16 for selectively attaching an airplane seat thereto. The base 22' includes a set of holes 37 extending from the top side 41 to the bottom side 38 and each offset from a set of shanks or stems 36. The EFDs 20, 21 utilize the same components as indicated in the first embodiment of the present invention and are numbered accordingly, except the base 22' of the present embodiment is now common to both EFDs 20, 21. Accordingly, reference may be made back to FIG. 1 or 2 as necessary.

It is recognized that while the stems 36 extending from the base 22' face in the same general direction, the stems 36 may face in any direction required by a particular application and need not face in the same direction as each other.

FIG. 4A shows a perspective view of the eccentric fastening device 20 in a non-fastened pre-assembled position 60 in accordance with the second embodiment as indicated in FIG. 3. The EFD 20 shown is assembled in a non-fastened pre-assembled position 60 whereby the tab 57 of the rotary lug 24 is resting against the second guide surface 45 and allowing the rotary lug 24 to eccentrically rotate in one direction as indicated by arrow A. The rotary lug 24 may be eccentrically rotated about its axis by the nut 30 until the tab 57 comes to rest against the first guide surface 44 releasing the lug seat 53 from the stem seat 42, wherein the first guide surface 44 will guide the first stop surface 54 of the head 50 of the rotary lug 24 until the flat-topped extrusion 12 of the airplane floor 14 is secured between the lug seat 53 of the rotary lug 34 and the bottom side 38 of the base 22'.

FIG. 4B shows a perspective view of the eccentric fastening device 21 in a variable fastened position 62 in accordance with the second embodiment as indicated in FIG. 3. The EFD 21 shown in a fastened position 60 securing the flat-topped extrusion 12 of the airplane floor 14 between the lug seat 53 of the rotary lug 34 and the bottom side 38 of the base 22'. The rotary lug 24 may be eccentrically rotated about its axis by the nut 30 wherein the second guide surface 45 will guide the second stop surface 55 until the rotary lug 24 is eccentrically rotated resting the lug seat 53 over the stem seat 42 and the tab 57 comes to rest against the second guide surface 45, thereby stopping the rotary lug 24 from eccentrically rotating about its axis in the reverse direction as indicated by arrow B.

Eccentric rotation of the head 50 of the rotary lug 24 for fastening is indicated by arrow C. Eccentric rotation of the head 50 of the rotary lug 24 for unfastening is in the opposite direction as indicated by arrow C.

Referring back to FIG. 3, the optional cap 32 facilitates removal of the EFD 20 by preventing the nut 30 from being backed off of the rotary lug 24, thereby preventing inadvertent loss of parts, especially in blind fastening applications. Moreover, the optional cap 32 provides positive retention of the nut 30 while providing the necessary pretension load from the spring washer 26 for detent engagement of the head 50 to the stem 36.

FIG. 5 shows a top view of the seat fitting assembly 10 in accordance with the second embodiment of the invention. Representative clamping area is generally shown by the hidden lines of the lug seat 50 of the rotary lug 24 for EFD 21. It should be recognized that the maximum clamping area for the smallest installation envelope is obtained for a rotary lug 24 that may substantially rotate 180 degrees. However, it is recognized that smaller clamping areas may be obtained and the rotary lug 24 may rotate through any designed angle. Also shown, the seat fitting assembly 10 may include an eccentric rotation unguided indicator 64, an eccentric rotation guided indicator 66 and an arrow indicator 68. The eccentric rotation unguided indicator 64 represents a condition when the lug seat 53 of the rotary lug 24 is in a fully or partial seated or unseated position upon the stem seat 42 of the base 22'. The eccentric rotation guided indicator 66 represents a condition when the lug seat 53 of the rotary lug 24 may be variably fastened or unfastened from a selected surface. The arrow indicator 68 provides yet another method for determining the general or selected position of the EFD 21. The indicators 64, 66, 68 may be used selectively to provide for assurance during any assembly process utilizing the present invention.

Figure 8:
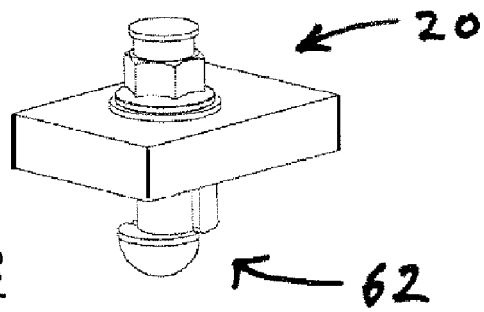
FIG. 8 is a view of a variable fastening position of an eccentric fastening device in accordance with the present invention.
Figure 9:
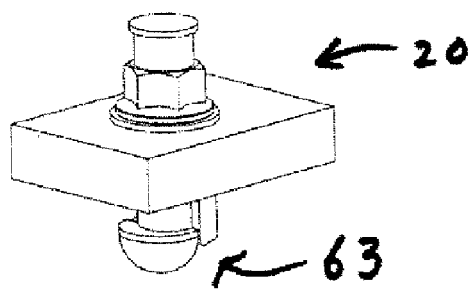
FIG. 9 is a view of a clamping position of an eccentric fastening device in accordance with the present invention.
Figure 10:
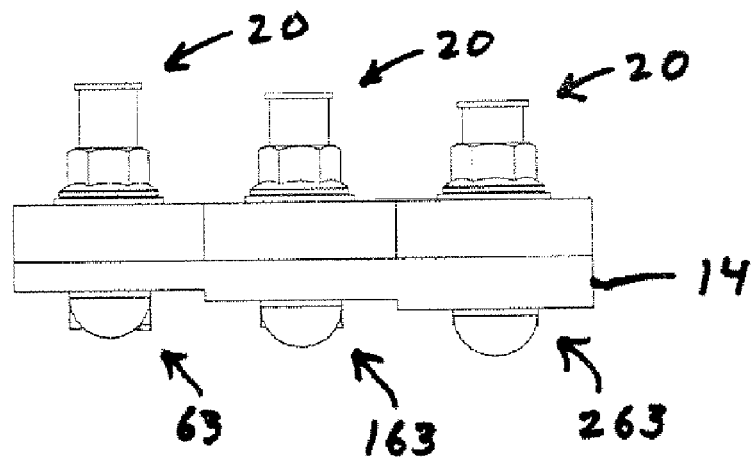
FIG. 10 is a view of an eccentric fastening device in three different clamping positions in accordance with the present invention.

Generally, a method of installation will now be described. Prior to installation, the rotary lug 24 of the EFD 20 is rotated into the parked or non-fastened pre-assembled position 60 being retained by force applied by the spring washer 26 (see also FIG. 7). The EFD 20 may then be compactly inserted into a hole within a subject surface, such as an airplane floor, and then eccentrically rotated with a wrench or screwdriver turning the nut 30, thereby un-parking the rotary lug 24 from the non-fastened pre-assembled position 60. The initial tightening action rotates the rotary lug 24 off of the parking detent, for instance, and through a 180° rotation into the pre-clamping or variable fastening position 62 (see also FIG. 8). Continued tightening of the nut 30 will bring the rotary lug 24 to a proper thickness or clamping position 63 (see also FIG. 9). FIG. 10 shows a view of an eccentric fastening device 20 in three different clamping positions 63, 163, 263 in accordance with the present invention. The floor 14 may have different thickness in which the present invention may be used to advantage.

Removal of the EFD 20 is a reverse procedure wherein the rotary lug 24 is loosened until the rotary lug 24 is moved from the fastening position 62 and rotated, for instance, through a 180° back into the non-fastened pre-assembled position 60, wherein the tab 57 stops the rotation when it engages the second guide surface 45 bringing it to the parked position, thereby allowing smooth removal of the assembly.

FIG. 6 is an exploded view of the eccentric fastening device 120 in accordance with a third embodiment of the present invention. The eccentric fastening device (EFD) 120 includes a base 122, a rotary lug 124, an optional spring washer 126, an optional flat washer (not shown), a bolt 129, an optional cap 132 and an optional pin 134.

The base 122 is stepped-cylinder shaped having a stem 136 extending from a bottom side 138 of the base 122 and a hole 137 extending through the bottom side 138 of the base 122. The stem 136 is semi-cylindrical or crescent-shaped having a first center (not shown), a first guide surface 144, a second guide surface 145, a stem seat 142, and an optional nub or protrusion 140 extending out of the stem seat 142. The hole 137 has a second center (represented by exploded view line 146) that is offset from the first center of the stem 136 such that a rotary lug 124 may be received through the hole 137 and rest against the stem seat 142 when the EFD 120 is in its non-fastened pre-assembled position. The base 122 provides structural support for supporting a rotary lug 124 while at the same time allowing for eccentric rotation of the lug 124 with respect to the stem 136 of the base 122.

The base 122 may optionally have a washer seat or countersink 139 in its top side 141 concentric with the hole 137 for advantageously receiving a spring washer 126 or a tapered bolt 129.

It is recognized that the base 122 may have any shape consistent with the present invention and need not be stepped-cylinder shaped. Also, the stem 136 may have any shape consistent with the present invention and need not be crescent-shaped.

The rotary lug 124 includes a cylindrical portion 148 having an internal thread 149 and a head 150. The head 150 is cylindrically shaped and includes a lug seat 153, a first stop surface 154, a second stop surface (not shown), an optional recess 156 in the lug seat 153, and a tab 157 extending from the lug seat 153 adjacent the first stop surface 154. The head 150 has a diametrical center (not shown) offset from a cylindrical center (represented by exploded view line 152) of the rotary lug 124 such that the lug seat 153 of the rotary lug 124 may rest against a stem seat 142 of a base 122 when the EFD 120 is in its non-fastened pre-assembled position. Moreover, the optional recess 156 of the rotary lug 124 may releasably receive a protrusion 140 of a base 122 when the EFD 120 is in its non-fastened pre-assembled position, thereby providing positive parking detent to facilitate installation and removal of the EFD 120.

It is recognized that the head 150 of the rotary lug 124 may have any shape consistent with the present invention and need not be cylindrically-shaped.

The tab 157 allows for partial eccentric rotation of the lug seat 153 of the rotary lug 124 by engaging the first guide surface 144 of the stem 136 of the base 122 when the lug seat 153 has cleared the stem seat 142 during eccentric rotation of the rotary lug 124. The tab 157, when acting in the opposite rotary direction, stops the partial eccentric rotation of the lug seat 153 of the rotary lug 124 by engaging the second guide surface 145 of the stem 136 of the base 122 when the lug seat 153 is eccentrically rotated onto the stem seat 142.

The bolt 129 optionally includes a bore 158 and a pin slot 159, where an optional cap 132 may be received in the bore 158 and retentively held by a spring pin 134 in the pin slot 159 of the bolt 129. The cap 132 advantageously prevents disassembly of the rotary lug 124 from the bolt 129, thereby maintaining retention of the non-fastened EFD 120 during a removal procedure.

Assembly of the EFD 120 is by receiving the cylindrical portion 148 of the rotary lug 124 through the hole 137 on the bottom side 138 of the base 122, and then retaining the rotary lug 124 to the base 122 by receiving the washer 126 and the bolt 129 into the internal thread 149 of the rotary lug 124 on the top side 141 of the base 122. The EFD 120 may be assembled into a non-fastened pre-assembled position whereby the tab 157 of the rotary lug 124 is resting against the second guide surface 145 and allowing the rotary lug 124 to eccentrically rotate in one direction; the spring washer 126 providing retention such that the protrusion 140 is releasably engaging the recess 156 thereby rotationally holding the rotary lug 124 in its non-fastened position; and the optional cap 132 preventing disassembly of the EFD 120 but allowing for rotation and tightening into a selected fastened position.

The EFD 120 may be attached to any surface, blind application or otherwise, by clamping a selected surface between the lug seat 153 of the rotary lug 124 and the bottom side 138 of the base 122. Also, when the EFD 120 of this embodiment is in its non-fastened pre-assembled position, the rotary lug 124 and the stem 136 provide for compact insertion through a hole in a selected surface.

Figure 11:
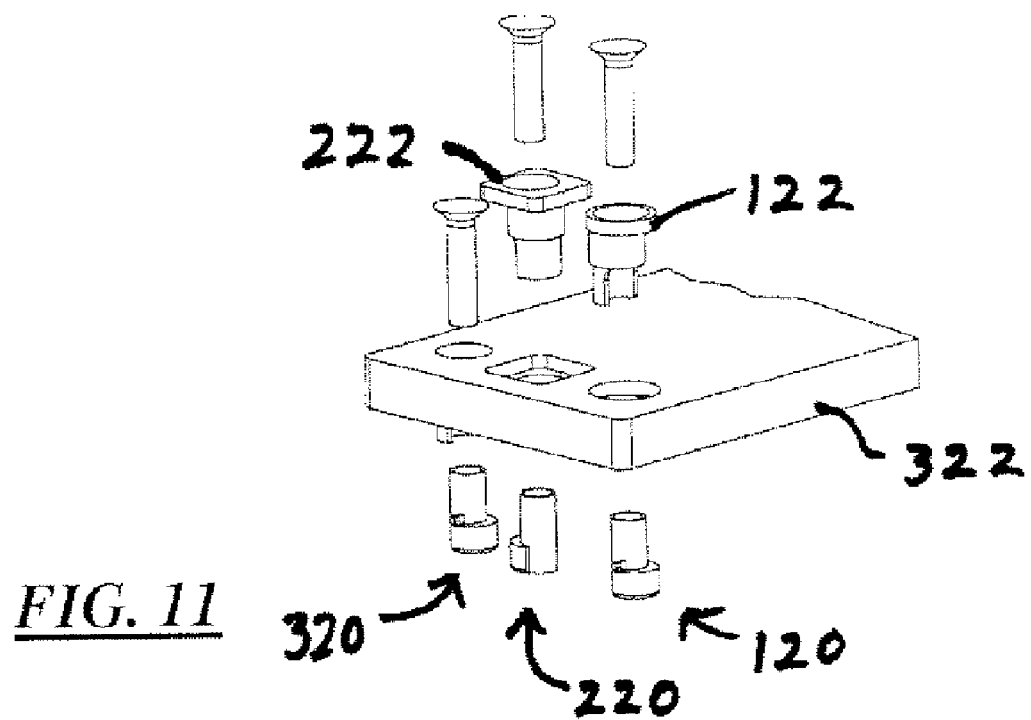
FIG. 11 is a view of alternate embodiments of three eccentric fastening devices in accordance with the present invention.

FIG. 11 shows a view of alternate embodiments of three eccentric fastening devices 120, 220, 320 in accordance with the present invention. In this view, the EFD 320 utilizes a base 322 to advantage. Whereas the EFDs 120, 220 utilize bases 122, 222, respectively, to advantage by being included into support base 322, whereby the bases 122, 222 may be positionally inserted into the support base 322 in several orientations for selective attachment to a floor or other structure.

Figure 12:
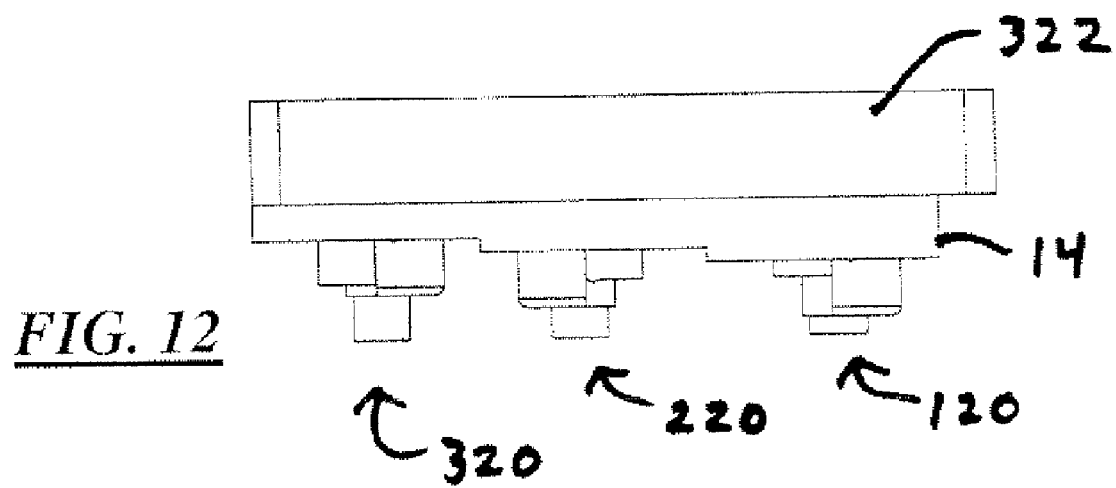
FIG. 12 is a view of three eccentric fastening devices clamping the thickness of a varying floor in accordance with the present invention.

FIG. 12 shows a view of the eccentric fastening devices 120, 220, 320 clamping the thickness of a varying floor 14 in accordance with the present invention. Significantly, the EFDs 120, 220, 320 may be advantageously attached to variable, constant or stepped thickness of a structure or floor 14. The EFDs 120, 220, 320 are each countersunk into the support base 322. However, it is recognized that the eccentric fastening devices need not be countersunk.

The above given embodiments of the invention utilize the standard right hand thread configuration for fasteners. However, it is recognized that the various parts may be configured for left handed fasteners necessarily requiring reverse modification of select parts.

While the material and/or treatment of the various parts of the eccentric fastening device have not been discussed, appropriate selection would be well understood by a person of skill in the art.

The above-described device, system and method, to one skilled in the art, are capable of being adapted for various applications and systems known in the art. The above-described invention can also be varied without deviating from the true scope of the invention.

What is claimed is:

1. An eccentric fastening device comprising: a first threaded fastener; a base, said base having a top, a bottom, a stem and a hole, said stem axially extending from said bottom and having a first center, and said hole axially extending from said top through said stem and having a second center; and a rotary lug releasably retained in said hole of said base by said first threaded fastener having a non-fastened pre-assembled position, said rotary lug having a cylindrical portion having a thread and a third center, and a head having a forth center, wherein said third center is offset from said forth center, wherein said third center is substantially axially concentric with said second center, and said forth center may be eccentrically rotated about said third center, whereby a selective structure may be variably clamped and releasably retained between said head and said base;

wherein said stem of said base has a stem seat for receiving a lug seat on said head in a non-fastened pre-assembled position, a first guide surface and a second guide surface for guiding said head during releasable variable fastening of a selected structure;

wherein said head has a first stop surface and a second stop surface respectively engaging said first guide surface and said second guide surface for guiding said head during releasable variable fastening of a selected structure; and wherein said head has a tab extending from said lug seat approximate to said second stop surface, wherein said tab allows for partial eccentric rotation of the lug seat of the rotary lug by engaging the first guide surface of the stem of the base when the lug seat has cleared the stem seat during eccentric rotation of the rotary lug, and said tab in the opposite rotary direction stops the partial eccentric rotation of the lug seat of the rotary lug by engaging the second guide surface of the stem of the base when the lug seat is eccentrically rotated onto the stem seat.

2. The eccentric fastening device of claim 1 wherein said first threaded fastener is a nut and said thread of said rotary lug is an external thread on said cylindrical portion of said rotary lug, wherein said nut variably retains said rotary lug to said base.

3. The eccentric fastening device of claim 1 wherein said first threaded fastener is a bolt and said thread of said rotary lug is an internal thread in said cylindrical portion of said rotary lug, wherein said bolt variably retains said rotary lug to said base.

4. The eccentric fastening device of claim 1 wherein said third center of said rotary lug is a cylindrical center, and said forth center of said head is a diametrical center.

5. The eccentric fastening device of claim 1 wherein said stem is a crescent-shaped shank wherein said first center is offset from said second center of said hole.

6. The eccentric fastening device of claim 1 wherein said forth center is substantially concentric with said first center when said rotary lug is in said non-fastened pre-assembled position.

7. The eccentric fastening device of claim 1 wherein said stem seat has a protrusion extending therefrom, and said lug seat has a recess for releasably receiving said protrusion when said head is in a non-fastened pre-assembled position.

8. The eccentric fastening device of claim 7 further comprising a spring washer between said first threaded fastener and said base, whereby said protrusion is releasably held in said recess by compression force of said spring washer.

9. The eccentric fastening device of claim 1 wherein said head is semi-spherically shaped.

10. The eccentric fastening device of claim 1 further comprising a spring washer, said spring washer compressed between said first threaded fastener and said base, wherein said head is releasably held to said stem by compression force of said spring washer.

11. The eccentric fastening device of claim 1 further comprising a support base, wherein said support base receives said base wherein an article is selectively retained between said head and said support base.

12. The eccentric fastening device of claim 1 further comprising an eccentric rotation unguided indicator, an eccentric rotation guided indicator or an arrow indicator, whereby said indicator may be used selectively to provide for assurance during assembly or removal.

13. An eccentric fastening device comprising: a first threaded fastener; a base, said base having a top, a bottom, a stem and a hole, said stem axially extending from said bottom and having a first center, and said hole axially extending from said top through said stem and having a second center; and a rotary lug releasably retained in said hole of said base by said first threaded fastener having a non-fastened pre-assembled position, said rotary lug having a cylindrical portion having a thread and a third center, a head having a forth center, wherein said third center is offset from said forth center, wherein said third center is substantially axially concentric with said second center, and said forth center may be eccentrically rotated about said third center, whereby a selective structure may be variably clamped and releasably retained between said head and said base; and
  a cap and a pin, wherein said cap is retained in a bore of said first threaded fastener by said pin, whereby said rotary lug is retained to said first threaded fastener by said cap preventing inadvertent disassembly.

14. An aircraft comprising: a structure, said structure having a flat-topped extrusion with a plurality of holes therethrough; and a fitting assembly, said fitting assembly having at least one eccentric fastening device, said eccentric fastening device comprising: a first threaded fastener; a base, said base having a top, a bottom, a stem and a hole, said stem axially extending from said bottom and said stem having a stem seat, and said hole axially extending from said top through said stem and offset therefrom; and a rotary lug releasably retained in said hole of said base by said first threaded fastener, wherein said rotary lug has a non-fastened pre-assembled position and a variable fastened position, said rotary lug having a cylindrical portion having a thread, and a head eccentrically offset from said cylindrical portion, and said head having a lug seat, wherein said head may eccentrically rotate onto said stem positioning said lug seat onto said stem seat in said non-fastened pre-assembled position, and wherein said head may eccentrically rotate off of said stem positioning said lug seat in said variable fastening position for receiving said structure between said lug seat and said base, wherein said fitting assembly is releasably inserted into at least one of said holes of said flat-topped extrusion and variably clamped to said structure by at least one eccentric fastening device;
  wherein said stem of said base has a stem seat for receiving a lug seat on said head in a non-fastened pre-assembled position, a first guide surface and a second guide surface for guiding said head during releasable variable fastening of a selected structure; and
  wherein said head has a first stop surface and a second stop surface respectively engaging said first guide surface and said second guide surface for guiding said head during releasable variable fastening of a selected structure; and
  wherein said head has a tab extending from said lug seat approximate to said second stop surface, wherein said tab allows for partial eccentric rotation of the lug seat of the rotary lug by engaging the first guide surface of the stem of the base when the lug seat has cleared the stem seat during eccentric rotation of the rotary lug, and said tab in the opposite rotary direction stops the partial eccentric rotation of the lug seat of the rotary lug by engaging the second guide surface of the stem of the base when the lug seat is eccentrically rotated onto the stem seat.

15. The aircraft of claim 14 wherein said structure is a floor and said fitting assembly is a seat fitting assembly, wherein an airplane seat may advantageously attached to said fitting assembly.

* * * * *